United States Patent [19]

Stritzel

[11] 3,994,375

[45] Nov. 30, 1976

[54] BRAKING SYSTEM FOR VEHICLE AXLE

[75] Inventor: Gene A. Stritzel, Webster, N.Y.

[73] Assignee: The Gleason Works, Rochester, N.Y.

[22] Filed: Oct. 8, 1975

[21] Appl. No.: 620,735

Related U.S. Application Data

[62] Division of Ser. No. 523,637, Nov. 14, 1974, abandoned.

[52] U.S. Cl. .............................. 192/4 A; 74/710.5; 188/71.3; 188/73.3
[51] Int. Cl.² ................. B60K 41/26; F16H 57/10; F16D 55/02
[58] Field of Search............ 192/4 A, 4 R; 74/710.5, 74/711; 188/71.1, 71.3, 73.3

[56] References Cited
UNITED STATES PATENTS

| | | | |
|---|---|---|---|
| 2,762,460 | 9/1956 | Butler | 188/71.3 |
| 3,393,581 | 7/1968 | Stockton | 74/710.5 |
| 3,439,785 | 4/1969 | Hughson | 192/4 A |
| 3,584,717 | 6/1971 | Suppes et al. | 188/71.3 X |
| 3,642,103 | 2/1972 | Schott | 192/4 A |
| 3,905,457 | 9/1975 | Shea | 192/4 A X |

Primary Examiner—Samuel Scott
Assistant Examiner—Lance W. Chandler
Attorney, Agent, or Firm—Ralph E. Harper

[57] ABSTRACT

A brake assembly is described in which two disk elements are mounted on a common axis of rotation so that a single braking unit can control braking action on both of the disk elements. The described arrangement provides for smaller diameter braking disks with no loss in braking effectivness of a given system.

5 Claims, 3 Drawing Figures

BRAKING SYSTEM FOR VEHICLE AXLE

RELATED APPLICATION

This application is a divisional application of copending application Ser. No. 523,637 now abandoned, filed Nov. 14, 1974.

BACKGROUND AND BRIEF DESCRIPTION OF INVENTION

The present invention provides for a modified form of disk brake assembly which may be used with the type of axle system described herein or with any other conventional axle system for reducing the diameter of braking disks without losing effective braking surface for a given system. The modified disk brake assembly includes two disk elements which are mounted on a common axis of rotation so that a single braking unit can control braking action on both of the disk elements. The single braking unit includes first and second caliper sections which are positioned in overlapping relationship to one another so that a single hydraulic control means can be used to operate both of the caliper sections simultaneously.

The improved system of the present invention can provide for more uniform braking of both axle shafts of an axle system having a differential unit contained therein, and the improvements of this invention can be applied to front wheel drive and four wheel drive axles as well as more conventional rear wheel drive axles. The system provides for lighter weight and fewer parts in the braking system. Normal differential action of the axle system is not impaired under normal driving conditions, and yet, a locking differential feature can be included within the system for automatic locking of the axle system under extreme or adverse driving conditions.

These and other features and advantages of the present invention will become apparent in the more detailed discussion which follows and in that discussion reference will be made to the accompanying drawings as briefly described below.

DETAILED DESCRIPTION OF INVENTION

Figure 1:
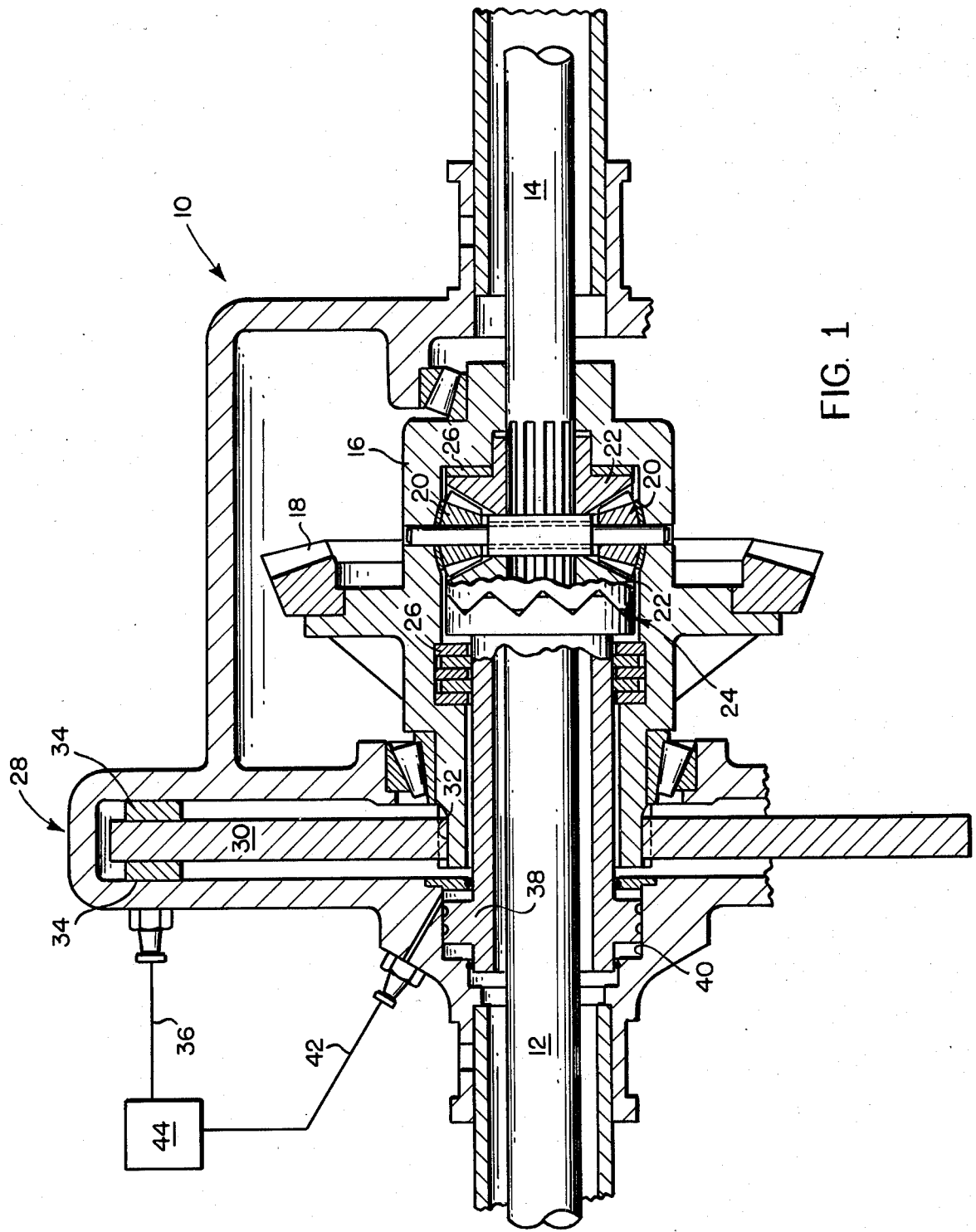
FIG. 1 is an elevational view, partly in cross-section, of an axle system incorporating basic improvements of the present invention.

FIG. 1 illustrates a typical axle system which has been modified to include structural features of the present invention. The basic axle system is of a type which includes a known form of differential unit 10 for controlling relative rotation between a first axle shaft 12 and second axle shaft 14. A common drive train (not illustrated) serves to impart driving moments to a differential case 16 through a known ring gear assembly 18. Rotation of the differential case 16 results in a division of rotational torque between the two axle shafts 12 and 14 through a pair of pinion gears 20 which are in meshing engagement with a pair of side gears 22, and this action is well known in the art.

In addition, the illustrated axle system includes a locking means for resisting or preventing relative rotation between the axle shafts 12 and 14. This locking means includes known components such as a face coupling assembly 24 made up of two face coupling sections designed to automatically spread apart when the rotational resistance of one axle shaft exceeds that of the other by a predetermined amount. Coupling assemblies of this type are well known in the art as exemplified by U.S. Pat. No. 2,855,805, and such assemblies typically provide for one or more frictional elements 26 operatively associated with opposite sides of the differential units so as to effectively lock the separate axle shafts 12 and 14 to portions of the differential case 16.

For purposes of illustrating an application of the present invention, the typical axle assembly which has been described above is modified by the addition of two separate braking means for simultaneously operating on the axle system. Such a combination of braking means is known in the art, as shown, for example, in U.S. Pat. No. 3,439,785. A first braking means 28 functions to brake the differential case 16 so as to resist and stop the transfer of driving moments from the differential case 16 to the separate drive shafts 12 and 14. The first braking means 28 comprises a disk brake means 30 secured to a splined section 32 of the differential case, and a known caliper unit with opposed braking pads 34 (schematically illustrated in FIG. 1) is provided for frictionally contacting the disk element 30 when hydraulic pressure is applied to the braking means through a hydraulic conduit 36 (illustrated schematically). Applications of a hydraulic force to the braking pads 34 has the effect of resisting and stopping rotation of the disk element 30 and of the differential case 16.

A second braking means includes a piston member 38 carried within a chamber 40 and connected to an outboard section of the face coupling assembly 24. This braking means functions to engage a portion of the face coupling assembly with one or more friction rings 26, as the piston member 38 and its associated face coupling section are axially moved towards the left in the FIG. 1 view. This action is obtained through the introduction of hydraulic fluid through a conduit 42 into the piston chamber 40. Hydraulic fluid is supplied through both of the conduits 36 and 42 from a common hydraulic system 44 which is schematically illustrated in the FIG. 1 view since it is a well known type of system in this art. Such a system includes a brake pedal or lever which can be manually operated to cause hydraulic fluid to be pumped through the conduits 36 and 42. Means for returning the piston 38 to its starting position (towards the right in FIG. 1) are not shown but may include any known spring means acting on a back face of the piston member 38. In addition, return conduits are provided in communication with the chamber 40 for dumping hydraulic fluid from the chamber as the piston member 28 is returned to its starting position. Thus, it can be seen that when the braking system 44 of the vehicle is actuated by an operator, there is a simultaneous action on both of the braking systems associated with the axle system. One braking system functions to stop rotation of the differential case 16, and the other braking system functions to lock the axle shafts 12 and 14 to the differential case 16 to thereby stop rotation of these axle shafts.

The axle system of FIG. 1 can provide normal differential and limited slip functions when the braking means discussed above are not being used. These functions result from differential action provided by the pinion gears 20 and side gears 22 and from the action provided by the known face coupling assembly 24. In addition, a range of differential action will be maintained even if the two braking means discussed above are applied while a vehicle is following a curved path (requiring differential action between the two axle shafts 12 and 14) because slippage between braking elements 30 and 34 and between the coupling assembly 24 and the friction disks 26 will continue until a completely locked condition is achieved for the axle system.

Although the basic system is illustrated in FIG. 1, in a somewhat schematic form, it can be appreciated that certain design changes may be required for given axle systems. For example, it should be appreicated that the caliper portion of the first braking system 28 is of a known design which encloses only a sector of the entire disk element 30 so that access is provided for maintenance and replacement of the braking pads 34 in accordance with known assemblies and techniques. Thus, the housing structure which is shown around the disk element in FIG. 1 is not continuous for the entire periphery of the disk element 30. In addition, it may be desirable to reduce the diameter of the disk element 30 so as to provide for a needed amount of road clearance in the area of the differential unit to which it is secured. For this purpose, FIG. 2 illustrates a modified form of disk element 30 which may be used with the axle system shown in FIG. 1 or with any axle system which requires a reduced diameter disk brake system.

Figure 2:
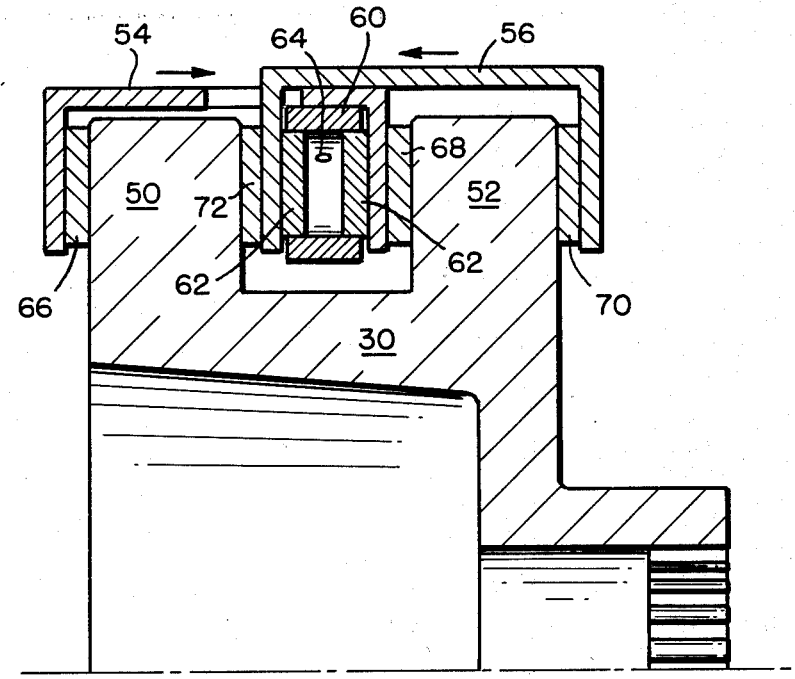
FIG. 2 is an elevational view in cross-section, and in greatly enlarged scale, of a modified braking disk assembly for use with the type of system illustrated in FIG. 1.

The disk assembly which is illustrated in FIG. 2 includes two disk elements 50 and 52 which may be formed from separate structures connected to one another or formed as an integral unit, as illustrated. Either way, the two disk elements 50 and 52 are functionally connected to one another so as to operate as a single unit mounted on a common axis of rotation. The two elements comprise disk-shaped structures which are spaced from one another in a parallel relationship so that a single braking unit can control braking action on both of the disk elements 50 and 52.

The braking unit which controls braking action on both of the disc elements 50 and 52 comprises a first caliper section 54 and a second caliper section 56 arranged to overlap one another (in the manner shown schematically in FIG. 3) so that a space 58 (see FIG. 3) is provided between portions thereof. A hydraulic control means in the form of an open-ended cylinder member 60 having a pair of piston members 62 is installed into the space 58 so as to be secured to one of the caliper units 54. A conduit (not shown) is connected to the cylinder member 60 through an opening 64 so that hydraulic fluid can be introduced within a chamber formed therein to urge both of the piston members 62 outwardly into contact with portions of the two caliper units 54 and 56. It can be seen that the first caliper unit 54 carries a braking pad 66 for contacting a first face of the disk element 50 together with a brake pad 68 for contacting a first face of the disk element 52. The second caliper unit 56 carries brake pads 70 and 72 for contacting second faces of the disk elements 52 and 50, respectively. The disk pads 66, 68, 70, and 72 are mounted within the caliper units in a well known manner, but the mounting structures have been omitted from the drawings for clarity. Both caliper units are mounted to a fixed part of the vehicle or associated axle system so that the disk elements 50 and 52 rotates relative to the positions of the caliper units.

Figure 3:
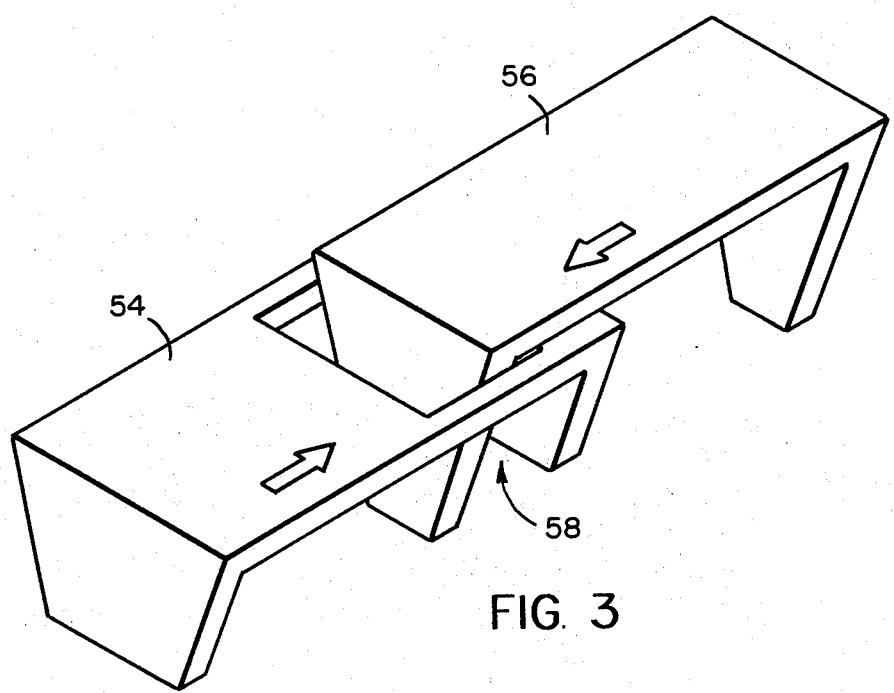
FIG. 3 is a schematic view, as seen in perspective, of a type of overlapping caliper arrangement which may be used with the dual disk elements shown in FIG. 2.

In operation, the development of hydraulic pressure within the cylinder member 60 functions to urge the piston members 62 in opposed directions, and this has the effect of moving the caliper units in the directions indicated by the arrows in FIGS. 2 and 3. This simultaneous movement of both caliper units results in a uniform application of braking force on both exposed faces of both of the disk elements 50 and 52 through the action of the braking pads 66, 68, 70, and 72. Thus, there is provided a relatively simple and reliable hydraulic control system for simultaneously actuating two separate caliper units for a dual disk braking assembly. This type of braking assembly may be used in any application where disk brakes are desired and is not limited to usage in the type of axle system illustrated in FIG. 1.

Although the invention has been described with reference to preferred embodiments, it can be appreciated that persons skilled in the art will make modifications and substitute fully equivalent structures for those which have been discussed and described. For example, specific designs of the axle system may provide for cooling fins on the differential case 10 or on the disk structures 30, 50, or 52 for dissipating frictional heat from the axle system. Such modifications and equivalent structures are intended to be included within the scope of protection defined in the claims which follows.

What is claimed is:

1. An improved brake assembly comprising
   a disk assembly having two disk elements functionally connected to one another so as to operate as a single unit, said disk elements being mounted on a common axis of rotation and being spaced from one another in a parallel relationship so that a single braking unit can control braking action on both of the disk elements,
   a braking unit containing friction pads for contacting opposite faces of each of said disk elements to thereby apply a braking force to the disk elements, said braking unit further comprising
      a first caliper section for carrying friction pads positioned to contact first faces of said disk elements,
      a second caliper section for carrying friction pads positioned to contact second faces of said disk elements, and
      hydraulic control means operatively associated with said first and second caliper sections to urge said housing sections to positions where all of said friction pads are brought into braking contact with said disk elements at the same time.

2. The improved brake assembly of claim 1 wherein said first and second caliper sections are arranged so that a portion of one caliper section can be overlapped with a portion of the other caliper section to define a space therebetween in which said hydraulic control means is carried for actuating movement of both housing sections relative to each other and to said disk elements.

3. The improved brake assembly of claim 2 wherein said hydraulic control means includes an open-ended cylinder member secured between said overlapping portions of said caliper sections, and including a pair of piston members carried within said cylinder member for moving said caliper sections into braking positions when hydraulic pressure is developed within said cylinder member.

4. The improved brake assembly of claim 1 wherein said disk assembly is secured to a differential case for braking rotation of the differential case, and including a separate braking means for locking separate axle shafts associated with said differential case.

5. The improved brake assembly of claim 4 wherein said brake assembly and said separate braking means are both controlled from a common hydraulic system.

* * * * *